G. RICHARDS.
MACHINE FOR BACKING OFF THE TEETH OF HOBS FOR CUTTING SCREW THREADS.
APPLICATION FILED AUG. 21, 1919.

1,355,780.

Patented Oct. 12, 1920.

3 SHEETS—SHEET 3.

INVENTOR
George Richards

UNITED STATES PATENT OFFICE.

GEORGE RICHARDS, OF WESTMINSTER, LONDON, ENGLAND, ASSIGNOR TO THE RICHARDS THREAD MILLING MACHINE COMPANY (1918) LIMITED, OF WESTMINSTER, LONDON, ENGLAND.

MACHINE FOR BACKING OFF THE TEETH OF HOBS FOR CUTTING SCREW-THREADS.

1,355,780. Specification of Letters Patent. Patented Oct. 12, 1920.

Application filed August 21, 1919. Serial No. 318,965.

*To all whom it may concern:*

Be it known that I, GEORGE RICHARDS, a citizen of the United States, residing at The Outer Temple, 222 Strand, in the city of Westminster, London, England, have invented new and useful Improvements in Machines for "Backing Off" the Teeth of Hobs for Cutting Screw-Threads, of which the following is a specification.

This invention relates to improvements in machines for backing off the teeth of hobs for milling screw-threads; same being capable of adaptation for use in treating taper hobs for use in cutting threads on or in tapered surfaces.

Figure 1:
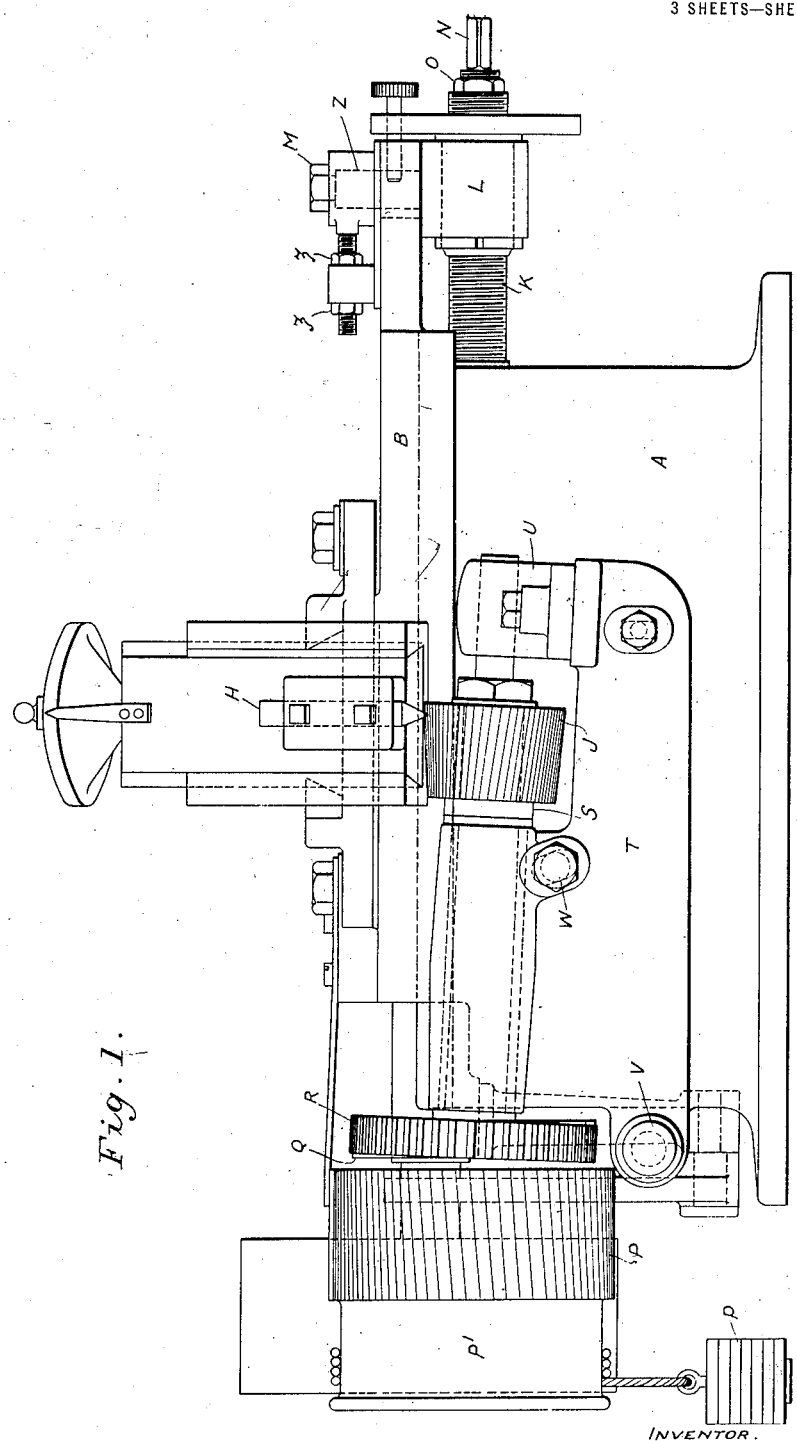
Figure 2:
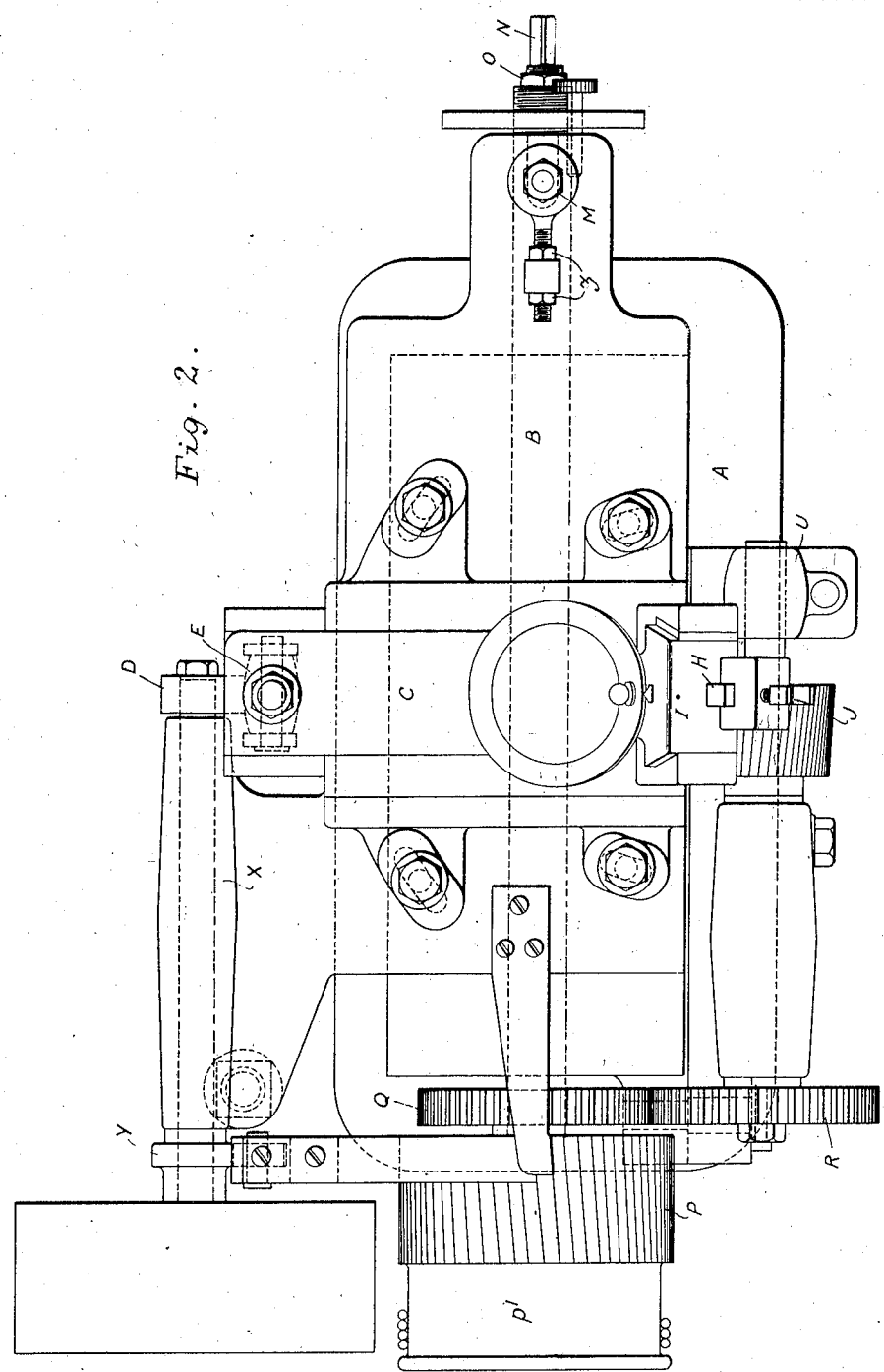
Figure 3:
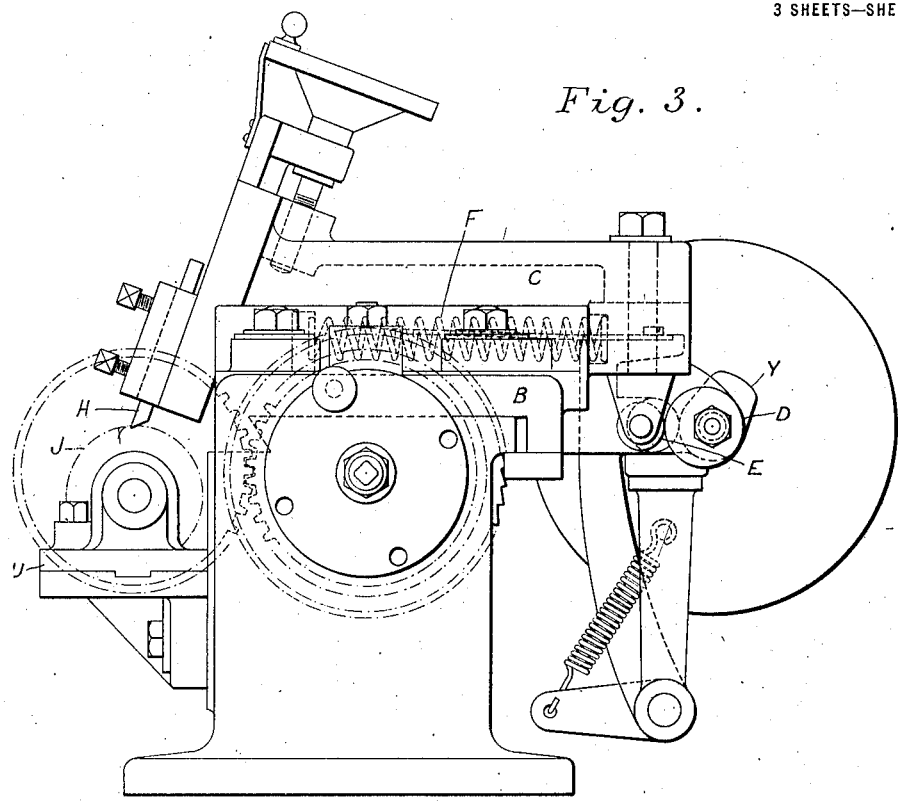
Figure 4:
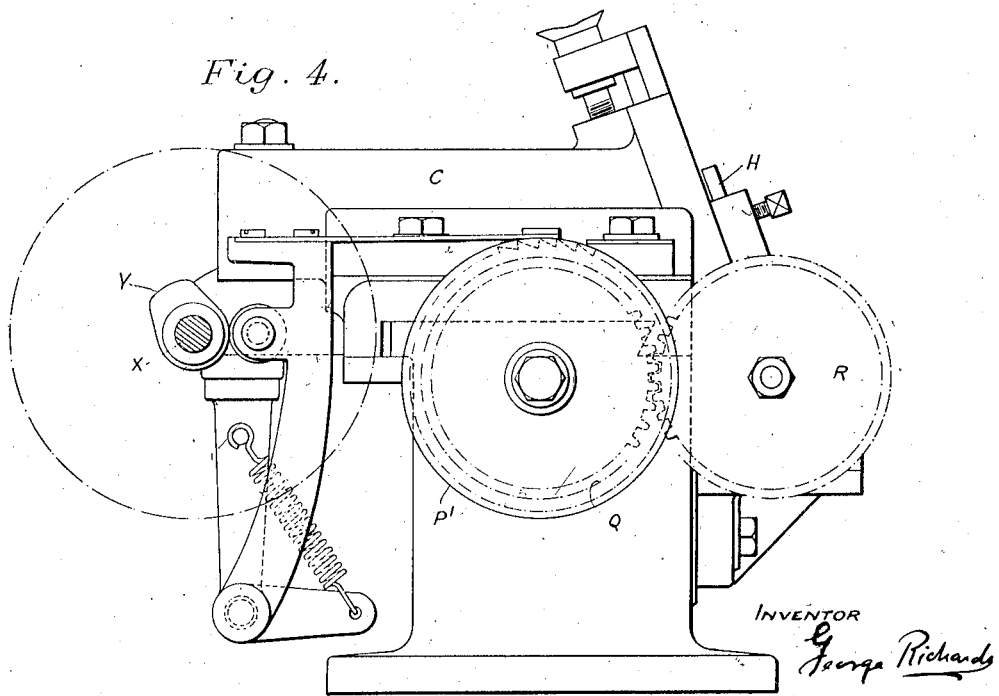

A machine constructed according to my present invention and adapted for backing off the teeth of taper hobs is represented in the accompanying drawings, whereof Figure 1 is a front elevation; Fig. 2 a plan view, and Figs. 3 and 4 end elevations.

The machine comprises a bed-plate A fitted with a longitudinal slide B on which is mounted a transverse slide C; the latter partaking of a reciprocatory motion effected by means of a cam D acting against a roller E and spring F; the return stroke of the slide C being effected by means of the said spring which also maintains the roller E in contact with the cam D. Upon the transverse slide is mounted a planing tool H; the cam D being so shaped as to impart to the transverse slide C and the planing tool H a constant speed during their forward or operative movement. The transverse slide C is pivoted at the front at I with the object of enabling it to be swiveled and set at a slight angle to correspond with the obliquity of the thread on the work-piece or hob J.

The longitudinal slide B is operated by means of a master-screw K which works through a nut L clamped to the slide by means of a nut M; the thread of the screw K corresponding in pitch with that of the hob under treatment. Under these conditions, the screw K and nut L can be readily removed and others substituted for the treatment of a hob having a different pitch of thread; the screw K being separate from the shaft N, but held thereto by means of the nut O. The shaft N, whereby the master-screw K is actuated, is furnished with a ratchet-wheel P formed with teeth corresponding in number with that of the teeth comprised in one thread of the hob to be treated. Attached to the ratchet-wheel is a gear wheel Q, formed with helical teeth and meshing with a similar and equal gear-wheel R; such gear being adapted to admit of the slight change which takes place in the plane of one of these wheels as hereinafter described. The work-spindle S, carrying the work-piece J to be treated, is mounted on a bracket T; the bearing U affording additional support, but being readily removable for enabling the work-piece to be changed. The bracket T is pivoted on a stud V, and is clamped by means of locking screws W. This bracket is set at an angle with a view to bringing the side of the hob operated upon into alinement with the slide B and its supporting surface on the bed A, so that the slide in its longitudinal movement causes the tool to act on the cutter teeth equally throughout the length of the hob. The driving shaft X, which operates the cam D, also carries a cam Y for actuating the pawl pertaining to the ratchet-wheel P for effecting the rotation of the work-piece as before described. Each revolution of this cam moves the ratchet one tooth; a corresponding rotative movement being transmitted, by means of the helically toothed gear-wheels Q, R, to the hob. In order to provide against "backlash" and to insure exact register during the action of the cutting tool, the ratchet-wheel is preferably formed with an extension P' wound with a cord carrying a weight $p$; such addition serving to maintain proper relation between the pawl and the teeth of the ratchet.

In order to provide for the slide C being set at an angle to correspond with the obliquity of the threads on the work-piece, the roller E is made barrel-shaped, and the cam D is formed with a concave surface to correspond.

At the commencement of the backing off operation, the planing tool H is adjusted to the correct position over the thread on the hob by means of the screw Z and the nuts $z$ $z$. The nut L, embracing the master-thread K, is then clamped in position by means of the nut M.

The operation of the machine and the results obtained are similar to those of the machine described in the specification to Richards and Beaumont's British patent, dated the 30th October, 1916, No. 110788; subject to the important difference that, in the present instance, a gradual lateral movement is imparted to the planing tool, instead of a gradual axial movement being imparted to the work-piece.

I claim:—

1. A machine for backing off the teeth of thread milling cutters of the hob type, comprising means for intermittently rotating the work piece, a planing tool and means for imparting gradual lateral motion to the planing tool while the work piece partakes of rotative movement.

2. A machine for backing off the teeth of thread-milling cutters of the hob type, including a longitudinally sliding carriage, a transverse carriage mounted thereon and carrying a planing tool, a master-thread for actuating the longitudinally sliding carriage, a ratchet element for operating the master thread and means for imparting a to and fro movement to the transverse carriage.

3. Device according to claim 2 including means for angularly adjusting the position of the transverse carriage relatively to the longitudinally sliding carriage.

4. Device according to claim 2 including means for pivotally adjusting the work piece relatively to the planing tool and means for securing the work piece in adjusted position.

GEORGE RICHARDS.